(12) United States Patent
Zheng (10) Patent No.: US 12,523,518 B2
(45) Date of Patent: Jan. 13, 2026

(54) ELECTROMAGNETIC COUPLING SENSING DEVICE, SIGNAL MEASUREMENT METHOD, AND RELATED ELECTRONIC DEVICE

(71) Applicant: SMYZE INTELLIGENCE TECHNOLOGY (SHANGHAI) CO., LTD, Shanghai (CN)

(72) Inventor: Fang Zheng, Shanghai (CN)

(73) Assignee: SMYZE INTELLIGENCE TECHNOLOGY(SHANGHAI) CO., LTD, Shanghai (CN)

( * ) Notice: Subject to any disclaimer, the term of this patent is extended or adjusted under 35 U.S.C. 154(b) by 341 days.

(21) Appl. No.: 18/454,988

(22) Filed: Aug. 24, 2023

(65) Prior Publication Data

US 2024/0310203 A1 Sep. 19, 2024

(30) Foreign Application Priority Data

Mar. 13, 2023 (CN) .......................... 202310244957.X (51) Int. Cl.
*G01G 3/15* (2006.01)

(52) U.S. Cl.
CPC ...................... *G01G 3/15* (2013.01)

(58) Field of Classification Search
CPC . G01G 3/15; G01G 3/16; G01G 37/02; G01L 1/042; G01L 1/14
USPC ............................................................ 177/1
See application file for complete search history.

(56) References Cited

U.S. PATENT DOCUMENTS

| | | | |
|---|---|---|---|
| 7,123,129 B1* | 10/2006 | Schrott | G06K 19/07749 340/505 |
| 8,643,281 B2* | 2/2014 | York | H03H 7/40 156/345.43 |
| 9,778,777 B2* | 10/2017 | Yeh | G06F 3/04164 |
| 12,055,600 B2* | 8/2024 | Arai | G01R 29/12 |
| 2017/0353056 A1* | 12/2017 | Kawai | H01P 5/18 |

FOREIGN PATENT DOCUMENTS

| | | |
|---|---|---|
| DE | 2211359 A1 | 9/1973 |
| PL | 429809 A1 | 11/2020 |

OTHER PUBLICATIONS

European Extended Search Report in European application No. 23194721.9,mailed on Jun. 4, 2024.

\* cited by examiner

*Primary Examiner* — Jacques M Saint Surin
(74) *Attorney, Agent, or Firm* — PV IP PC; Wei Te Chung (57) ABSTRACT

An electromagnetic coupling sensing device includes a frequency generation module, a first resonant module, a second resonant module, and an echo acquisition and processing module. The first resonant module generates a primary resonant signal based on the frequency setting signal generated by the frequency generation module. The second resonant module couples with the first resonant module through a coupling capacitance to generate a secondary resonant signal based on the primary resonance signal. The second resonant module includes a coil. A ferrite is provided in the coil and a height of the coil is higher than the ferrite. The coil is capable of carrying a weight to be measured to deform such that an intrinsic frequency of the electromagnetic coupling sensing device changes. The echo acquisition and processing module collects the secondary (Continued)

resonant signal and outputs a voltage signal changing according to the intrinsic frequency.

20 Claims, 3 Drawing Sheets

ELECTROMAGNETIC COUPLING SENSING DEVICE, SIGNAL MEASUREMENT METHOD, AND RELATED ELECTRONIC DEVICE

CROSS REFERENCE TO RELATED APPLICATION

This application claims the priority of Chinese Patent Application No. 202310244957X, entitled "ELECTROMAGNETIC COUPLING SENSING DEVICE, SIGNAL MEASUREMENT METHOD, AND RELATED ELECTRONIC DEVICE", filed on Mar. 13, 2023, the disclosure of which is incorporated herein by reference in its entirety.

FIELD OF THE DISCLOSURE

The present disclosure relates to electronic circuit technologies, in particular to an electromagnetic coupling sensing device, a signal measurement method and a related electronic device.

BACKGROUND

With the popularity of global artificial intelligence scenarios, machinery and equipment have been widely used in assembly lines to replace workers to participate in heavy manual labor and thus greatly improves social production efficiency. On the other hand, mechanical equipment has gradually been popularized to people's homes, such as intelligent sweeping robots, coffee machines, and food delivery robots. Whether it is industrialization scenarios or daily life scenarios, there is a problem of raw material supply in intelligent equipment. Therefore, it is necessary to detect the remaining amount of raw materials in order to replenish them in time when the materials are not enough, so as to avoid the waste of resources caused by the machine being unable to work due to the shortage of materials.

Conventionally, solid materials are usually measured by piece, length and weight. For liquids and gases, volume measurement (or flow measurement) and weight measurement are usually used. Generally, volume sensors or weight sensors are used for measurement, but both volume and weight sensing sensors are linear devices, so their sensitivity is limited by the mechanism of the device itself.

SUMMARY

One objective of an embodiment of the present disclosure is to improve the accuracy of existing gas/liquid quality detection.

According to an embodiment of the present disclosure, an electromagnetic coupling sensing device is disclosed. The electromagnetic coupling sensing device includes: a frequency generation module, a first resonant module, a second resonant module, and an echo acquisition and processing module. The frequency generation module generates a frequency setting signal. The first resonant module generates a primary resonant signal based on the frequency setting signal. The second resonant module couples with the first resonant module through a coupling capacitance to generate a secondary resonant signal based on the primary resonance signal. The second resonant module comprises a coil disposed in a Z direction. A ferrite is provided in the coil and a height of the coil is higher than the ferrite. The coil is capable of carrying a weight to be measured to deform such that an intrinsic frequency of the electromagnetic coupling sensing device changes. The echo acquisition and processing module which is electrically connected to the second resonant module collects the secondary resonant signal and outputs a voltage signal changing according to the intrinsic frequency of the electromagnetic coupling sensing device.

Furthermore, the echo acquisition and processing module comprises a sampling unit, an operation amplification unit and a voltage comparison unit. A current of the secondary resonant signal sequentially passes through the sampling unit, the operation amplification unit and the voltage comparison unit to output the voltage signal.

Furthermore, the electromagnetic coupling sensing device further includes a microprocessor electrically connected to the output of the voltage comparison unit. The microprocessor receives the voltage signal to output quality data.

Furthermore, the frequency generation module comprises a crystal oscillator, and the electromagnetic coupling sensing device further comprises a microprocessor, a driving circuit and a switch circuit. The switch circuit comprises a first switch and a second switch, sources of the first switch and the second switch are electrically connected to a common end. A drain of the first switch is electrically connected to the first resonant module and a DC power supply. A drain of the second switch is electrically connected to the second resonant module. The microprocessor is connected to the driving circuit connected to the drain of the first switch and the drain of the second switch. The driving circuit is further electrically connected to gates of the first switch and the second switch, so as to change the DC power supply into a square wave of the same frequency as the crystal oscillator to input the square wave into the first resonant module and the second resonant module.

Furthermore, the coil is a copper coil, and a diameter range of the coil is 0.2 mm-1 mm.

Furthermore, a number of turns of the coil ranges from 5 turns-100 turns.

Furthermore, a thickness range of the ferrite is 33%-66% of the height of the coil in its relaxed state.

Furthermore, the ferrite is a cylinder with a diameter range of 4.5 mm-48 mm.

Furthermore, the first resonant module comprises a first frequency input end, a first frequency output end, a first coupling end and a second coupling end. An inductor is connected between the first frequency input end and the first coupling end. A first capacitor is connected between the first frequency output end and the second coupling end. The first coupling end and the second coupling end are coupled to the second resonant module.

Furthermore, the second resonant module comprises a third coupling end and a fourth coupling end. The third coupling end and the first coupling end are connected. The fourth coupling end and the second coupling end are connected. The coil and the second capacitor are connected in series between the third coupling end and the fourth coupling end. The first coupling end and the second coupling end are connected through a coupling capacitor.

Furthermore, the electromagnetic coupling sensing device further comprises a strain gauge connecting to an upper end of the coil.

Furthermore, the electromagnetic coupling sensing device further comprises a frame, having a cylinder that is inserted into the ferrite.

Furthermore, the electromagnetic coupling sensing device further comprises a power supply module, electrically connected to the frequency generation module or the echo acquisition and processing module, configured to buck an input voltage to supply power to the frequency generation module or the echo acquisition and processing module.

According to an embodiment of the present disclosure, a signal measurement method applied to the above-mentioned electromagnetic coupling sensing device is disclosed. The method comprises: connecting to a power supply; placing an item to be measured on the coil to deform the coil; and measuring a voltage signal output by the echo acquisition and processing module, wherein the voltage signal changes according to the intrinsic frequency of the electromagnetic coupling sensing device.

According to an embodiment of the present disclosure, an electronic device is disclosed. The electronic device comprises the above-mentioned electromagnetic coupling sensing device.

Advantageous Effect

In contrast to the conventional art, the electromagnetic coupling sensing device of an embodiment of the present disclosure inputs intrinsic frequency, through the first resonance module and the second resonance module, and can ensure that the two resonant circuits in the initial state of the system have the same intrinsic resonance frequency. The loss rate of the electromagnetic coupling sensing device is determined by the equivalent resistance of the coil in the second resonant module at the back end. When the loss is properly adjusted, the system is in a critical coupling state. The present disclosure uses the sensitivity near the critical coupling to increase the detection sensitivity. In addition, the electromagnetic coupling sensing device is very suitable for improving the measurement accuracy of electronic equipment.

BRIEF DESCRIPTION OF THE DRAWINGS

The drawings described herein are for illustration purposes only and are not intended to limit the scope of the present disclosure. In addition, the shapes and proportional dimensions of the components in the drawings are only schematic and are used to assist the understanding of the present application, and do not specifically limit the shapes and proportional dimensions of the various components of the present disclosure. Under the teaching of the present disclosure, those skilled in the art can select various possible shapes and proportional dimensions according to specific situations to implement this application.

DETAILED DESCRIPTION OF PREFERRED EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

The term "first", "second" are for illustrative purposes only and are not to be construed as indicating or imposing a relative importance or implicitly indicating the number of technical features indicated. Thus, a feature that limited by "first", "second" may expressly or implicitly include at least one of the features.

In the description of the present disclosure, the meaning of "plural" is two or more, unless otherwise specifically defined.

Throughout the specification and claims, when it is described that an element is "connected" to another element, the element may be "directly connected" to the other element, or "electrically connected" to the other element through a third element.

Furthermore, the term "comprising" will be understood as meaning the inclusion of elements but not the exclusion of any other elements, unless explicitly described to the contrary.

Techniques, methods and devices known to those of ordinary skill in the relevant art may not be discussed in detail, but where appropriate, such techniques, methods and devices should be considered part of the description.

The conventional volume measurement mainly measures in a unit of volume and there are generally two calculation methods. The first method can calculate the remaining material by calculating the consumed material on a per-time basis through fixed structural parts. This method can calculate the consumed amount each time based on the amount of fixed structural parts. The other method is to use the flow meter to real-time calculate the gas/liquid flow through the pipeline. However, regardless of which measurement method is used, the volume of the material consumed in the equipment is finally obtained. However, the measurement unit in gas/liquid storage and canned containers is mass. So, the volume needs to be transformed into the mass by the following density calculation equation:

$$m = \rho * V$$

where $\rho$ is the gas/liquid density, m is the mass, and V is the measured volume.

As is well known, the density of gas/liquid will change greatly with the change of temperature, so the applicability of the above measurement method is comparatively poor for scenarios with high accuracy requirements. Similarly, mass measurements are usually measured by gravimetry according to the equation below:

$$m = G/g$$

where G is the measurement of gravity, m is the mass, g is gravitational acceleration 9.8N/kg.

The working principle of the gravimetry sensor is to deform the strain gauge of the core component of the sensor through gravity, convert the deformation degree into a resistance value, and thus achieve high-precision weight detection by measuring the change of resistance value. Similarly, since the strain gauges are solid metal structures, thermal expansion can occur and accuracy deviations will occur.

In recent years, electromagnetic near-field coupling has been a major hot spot in scientific research. When two electrical/magnetic resonant units of the same frequency are in close proximity, coupling frequency cleavage occurs at the intrinsic frequency of the system resonant unit. The researchers found that cleavage in the system disappears when the loss parameters and coupling parameters in the system match. Based on the above theory, the researchers introduced the quantum mechanical concept of parity-time (PT) symmetry and called the above physical system with loss as "Non-Hermitian" system. The researchers found that when the system is at the above frequency splitting merging point, the intrinsic mode of the system is sensitive to perturbation to the power of ½ of the sensitivity of a single resonant unit. Therefore, the researchers believe that the above system is very suitable as the basic principle of the sensor, and there are already sensors that gradually use this physical mechanism to achieve high-precision detection.

Figure 1:
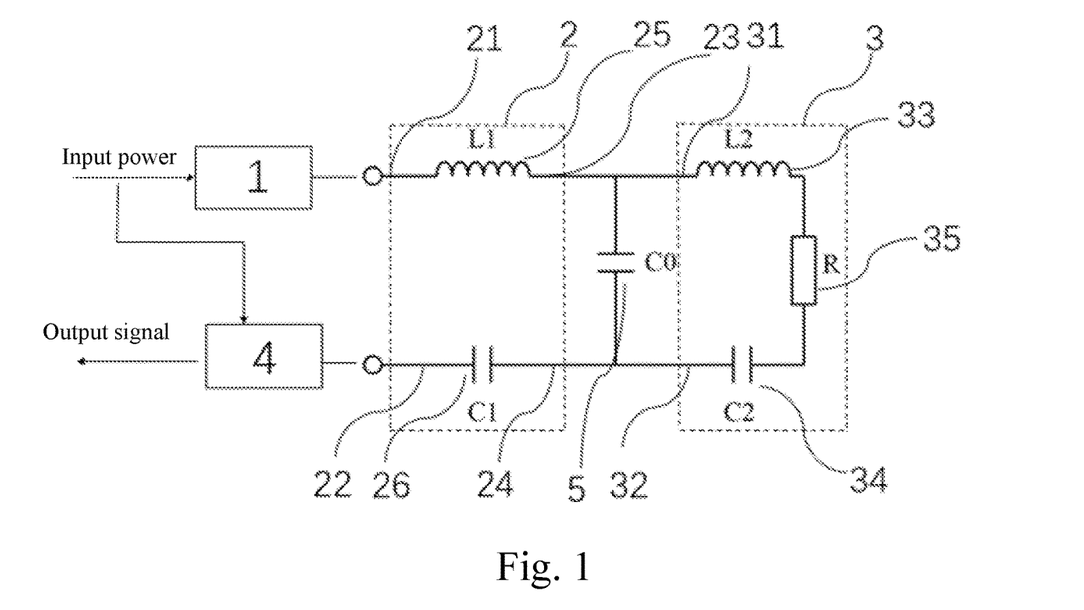
FIG. 1 is an equivalent schematic diagram of an electromagnetic coupling sensing device according to an exemplary embodiment of the present disclosure.

Please refer to FIG. 1. FIG. 1 is an equivalent schematic diagram of an electromagnetic coupling sensing device according to an exemplary embodiment of the present disclosure. As illustrated in FIG. 1, the electromagnetic coupling sensing device comprises a frequency generation module 1, a first resonance module 2, a second resonance module 3, and an echo acquisition and processing module 4.

The frequency generation module 1 is configured to generate a frequency setting signal. The first resonant module 2 is configured to generate a primary resonant signal based on the frequency setting signal. The second resonant module 3 is configured to couple with the first resonant module through a coupling capacitance to generate a secondary resonant signal based on the primary resonance signal. Here, the second resonant module 3 comprises a coil 33 disposed in a Z direction. A ferrite 36 is provided in the coil 33 and a height of the coil 33 is higher than the ferrite 36. The coil 33 is capable of carrying a weight to be measured to deform such that an intrinsic frequency of the electromagnetic coupling sensing device 1 changes. The echo acquisition and processing module 4 is electrically connected to the second resonant module and configured to collect the secondary resonant signal and output a voltage signal changing according to the intrinsic frequency of the electromagnetic coupling sensing device.

The frequency generation module 1 is used to generate a fixed frequency signal. The first resonant module 2 generates an oscillation signal such that the coil 33 in the second resonant module 3 is excited by a high-frequency current. That is, a high-frequency current with a certain frequency corresponding to the weight to be measured can be generated. The output voltage of the excitation current of the coil 33 is generated by echo acquisition and processing of the module 4.

In some embodiments, the frequency generation module 1 may be implemented with, but is not limited to, a fixed-frequency crystal oscillator.

In another embodiment, the frequency generation block 1 may use a high-precision RC circuit or the internal output of the MCU with sufficient accuracy. The benefits of crystal oscillators are high frequency accuracy and good temperature stability. In the present disclosure, the accuracy of the frequency generation module 1 will directly determine the accuracy of the electromagnetic coupling sensing device 11.

After the frequency generation module 1 (such as a crystal oscillator) is powered, it transmits a fixed-frequency square wave signal to the electromagnetic coupling hardware topology at the back end (the electromagnetic coupling hardware topology includes the first resonance module 2 and the second resonance module 3), and the transmission frequency is determined by the frequency of the electromagnetic coupling hardware topology composed of the back end. The square wave signal is reflected back to the echo acquisition and processing module 4 after passing the electromagnetic coupling hardware topology and then processed by the echo acquisition and processing module 4 to output a voltage signal to calculate the weight of the detection target.

Optionally, the upper end of the coil 33 may move in the Z direction, i.e., with the weight load deformation, and the lower end of the coil 33 is fixed.

In this embodiment, the electromagnetic coupling sensing device 11 uses the coil 33, which is deformed in the Z direction after bearing weight. The inductance of the coil 33 is used as a weight bearing deformation strain variable, thereby affecting the local oscillator frequency of the electromagnetic coupling sensing device. The electromagnetic coupling sensing device 11 not only has a better measurement accuracy and sensitivity, but also has a simple structure and is easy to implement.

In an embodiment, the echo acquisition and processing module 4 may include a rectifier circuit, a filter circuit, and an operational amplifier to amplify the signal to an appropriate ratio.

Figure 5:
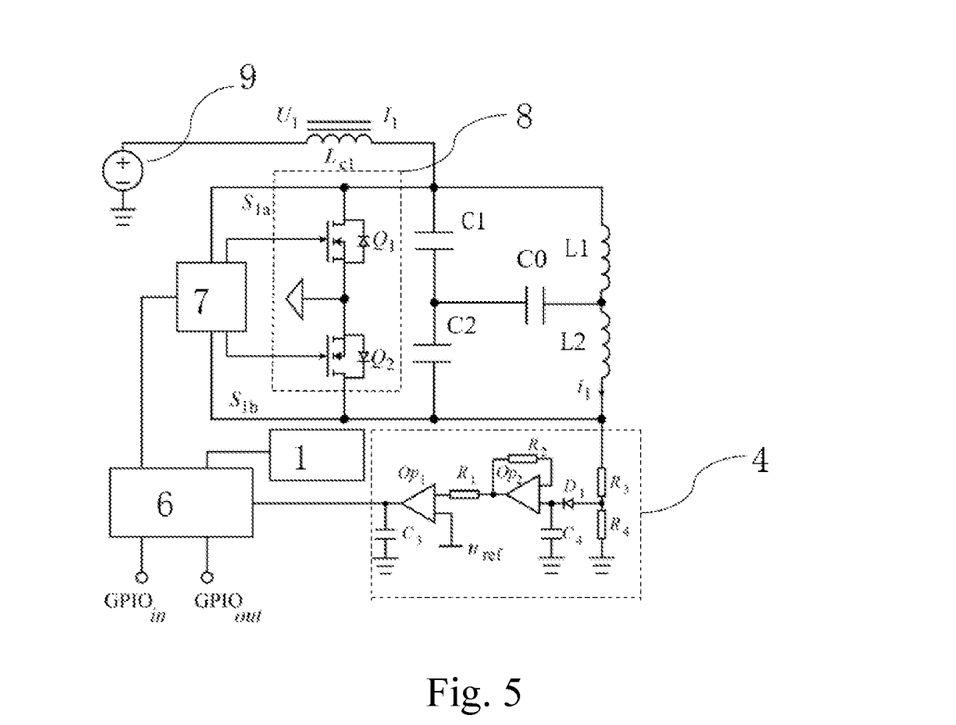
FIG. 5 is a schematic diagram of an echo acquisition and processing module of an electromagnetic coupling sensing device according to an exemplary embodiment of the present disclosure.

In some embodiments, As illustrated in FIG. 5, the echo acquisition and processing module 4 includes a sampling unit, an operation amplifier unit, and a voltage comparison unit. The current i1 of the secondary resonant signal sequentially passes through the sampling unit, the operational amplifier unit, and the voltage comparison unit to generate an output voltage signal.

As illustrated in FIG. 5, the sampling cell comprises a third resistor R3 and a fourth resistor R4, and the node between the third resistor R3 and fourth resistor R4 is inputted through diode D1 to an input of the second op amp Op2. The other input of the second op amp Op2 is connected to the output of the second op amp Op2 through the second resistor R2. The output of the second op amp Op2 is inputted to one input of the first op amp Op1 through the first resistor R1. The other input of the first op amp Op1 is connected to the reference voltage Uref, and the output end of the first op amp Op1 outputs the voltage signal.

The current i1 of the secondary resonant signal is directly coupled through the coil 33 and then the third resistor R3 and the fourth resistor R4 perform a voltage division function to generate an input voltage signal. Then, the input voltage signal is rectified by the diode D1 and filtered by the capacitor C4 and then inputted into the second op amp Op2. The second op amp Op2 is used to amplify the input voltage signal, and the amplifying ratio is determined by the first resistor R1 and the second resistor R2. Then, the amplified signal enters the first op amp Op1 for zero-crossing comparison to remove the noises. Here, Uref is the reference voltage for comparison. Finally, the output voltage signal is filtered by capacitor C3. Optionally, the output voltage can be inputted into a microprocessor 6.

The electromagnetic coupling sensing device further comprises a microprocessor 6. The microprocessor 6 is connected to the output of the voltage comparison unit to receive a voltage signal and output quality data. The microprocessor 6 can be implemented using prior art and thus further illustration is omitted here.

As illustrated in FIG. 5, the frequency generation module 1 includes a crystal oscillator, and the electromagnetic coupling sensing device 11 further comprises a microprocessor 6, a driving component 7 and a switch circuit 8.

The switch circuit 8 comprises a first switch Q1 and a second switch Q2. The sources of the first switch Q1 and the second switch Q2 are connected to the common terminal. The drain of the first switch Q1 is connected to the first resonant module, and the drain of the first switch Q1 is connected to the DC power supply. The drain of the second switch Q2 is connected to the second resonant module.

The microprocessor 6 is connected to the driving component 7. The driving component 7 is respectively connected to the drains of the first switch Q1 and the second switch Q2 and the gates of the first switch Q1 and the second switch Q2 to transform the DC power supply 9 into a square wave having the same frequency of the crystal oscillator and input the square wave into the electromagnetic coupling hardware topology (including a first resonant module 120 and a second resonant module 130).

The driving component 7 is mainly used to change the transmitter signal of the microprocessor 6 into a driving signal that can drive the MOSFET. The first switch Q1 and the second switch Q2 are two MOSFETs. In FIG. 5, the inverter topology is the Double-Class-E high-frequency inverter topology, which is characterized to have zero-voltage-switches (ZVS) and thus has a low loss with no high-frequency inversion distortion. At present, the wave output by the MCU can only reach the mini-watt (mw) level. In this embodiment, the circuit comprising the microprocessor 6, the driving component 7 and the switch tube assembly 8 can output the watt (W) level power. In this embodiment, the detection accuracy is improved because of the increased driving power, which is less affected by the environmental interference.

In FIG. 5, the inductor Lc1 is the freewheeling inductor at the transmitter side, which is mainly used for energy supply and filtering.

The microprocessor 6 could output the detection signal or update the analysis method through GPIO input/output ports.

In an embodiment, the first resonant module 2 may be implemented with a conventional oscillation circuit, such as an LC oscillator.

Figure 4:
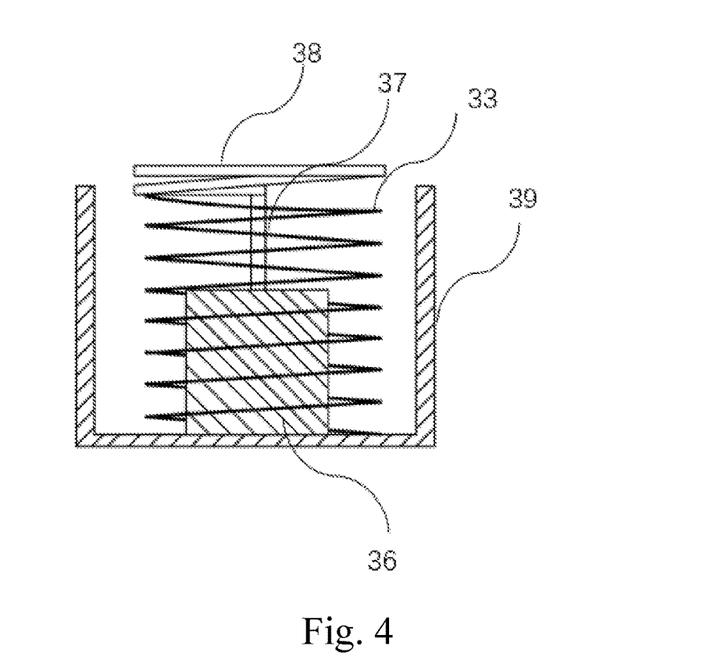
FIG. 4 is a schematic diagram of a coil structure of an electromagnetic coupling sensing device according to an exemplary embodiment of the present disclosure.

In an embodiment, the coil 33 is wound into a spiral, and the ferrite 36 is provided in the middle. This arrangement can reduce the leakage magnetic field and improve the sensitivity of the sensing device. Here, the height of the coil 33 is higher than that of the ferrite 36.

As illustrated in an embodiment in FIG. 1, the first resonant module 2 of the electromagnetic coupling sensing device 11 adopts an LC oscillation circuit. Since the working frequency of the system is a fixed frequency, the principle of the electromagnetic coupling sensing device is that the intrinsic frequency of the LC oscillator shifts from the original frequency such that the voltage of the original frequency changes. The conversion ratio of the voltage and the weight is roughly determined by the amplitude of the LC resonant circuit (which comprises the coil 33).

Figure 2:
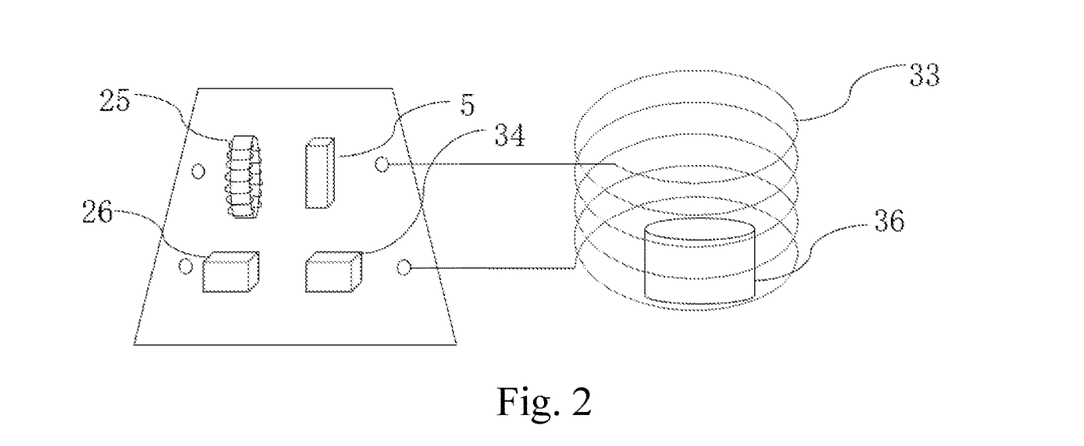
FIG. 2 is a schematic diagram of the electromagnetic coupling hardware topology of an electromagnetic coupling sensing device according to an exemplary embodiment of the present disclosure.

FIG. 1 shows that the electromagnetic coupling sensing device comprises two LC resonant circuits (the first resonant module 2 and the second resonant module 3) connected in series. The two LC resonant circuits are coupled together through a coupling capacitor 150C0. The electromagnetic coupling hardware topology is shown on the right of FIG. 1 and FIG. 2.

Optionally, the first resonant module 2 includes a first frequency input end 21, a first frequency output end 22, a first coupling end 23, and a second coupling end 24.

An inductor 25 is connected between the first frequency input end 21 and the first coupling end 23.

A first capacitor 26 is connected between the first frequency output end 22 and the second coupling end 24.

The first coupling end 23 and the second coupling end 24 are coupled with the second resonant module 3.

The second resonant module 3 includes a third coupling end 31 and a fourth coupling end 32. The third coupling end 31 and the first coupling end 23 are connected, the fourth coupling end 32 and the second coupling end are connected, and the coil 33 and the second capacitor 34 are connected in series between the third coupling end 31 and the fourth coupling end 32. The first coupling end 23 and the second coupling end 24 are connected by a coupling capacitor 5. The ferrite 36 is provided in the coil 33, which can be equivalent to connecting an equivalent resistor 35 in series in the coil 33 circuit.

According to the equation (I), the intrinsic resonant frequencies w of the two resonant loops can be obtained, expressed as:

$$\omega = 1/2\pi\sqrt{LC}. \qquad (I)$$

In this system, $$L = L_{11} = L_{22} \text{ and } \frac{1}{C} = \frac{1}{C_{11}} + \frac{1}{C_{00}} = \frac{1}{C_{22}} + \frac{1}{C_{00}}$$

This could ensure that the two resonant circuits have the same intrinsic resonant frequency in the initial state of the system. Here, $L_{11}$ and $L_{22}$ are inductances of the inductors in the two resonant loops, $C_{11}$ and $C_{22}$ the capacitances of the capacitors in the two resonant loops, and $C_{00}$ is the capacitance of the coupling capacitor between the two resonant circuits.

To simplify the model, physical quantities are used to replace electrical quantities to describe the system. Accordingly, the equations of motion of the two resonant loops in the system can be described as equation(II) below:

$$\frac{d\tilde{a}_1}{dt} = (i\omega_1 - \gamma)\tilde{a}_1 - i\kappa\tilde{a}_2 + \sqrt{2\gamma}\,S_{in}e^{-i\omega t} \qquad (II)$$

$$\frac{d\tilde{a}_2}{dt} = (i\omega_2 - \gamma)\tilde{a}_2 - i\kappa\tilde{a}_1$$

Here, $\tilde{a}_{1,2} = A_{1,2}e^{-i\omega t}$ represents the medium current oscillation state of the two resonant loops. $\omega_{1,2} = \omega_0$ is the intrinsic frequencies of the two resonant loops. $\omega$ is the inputted frequency of the crystal oscillator. $\gamma$ is the system loss rate, which is determined by the back-end equivalent resistance R. the relationship equation is $\gamma = R/2L$. $S_{in}$ is the voltage amplitude at the input end. i is the complex symbol. $\kappa$ indicates the near-field coupling strength or the near-field coupling coefficient of the first resonant loop and the second resonant loop, where $\kappa = k_0 * \sqrt{L_{11} * L_{22}}$. $k_0$ is the capacitive coupling coefficient.

By rewriting the equations of motion of the system, the system Hamiltonian matrix can be further obtained as the below equation (III):

$$H = \begin{pmatrix} \omega_1 + i\gamma & \kappa \\ \kappa & \omega_2 - i\gamma \end{pmatrix} \quad \text{(III)}$$

By solving the determinant of the matrix H, the intrinsic mode of the system can be further obtained as the below equation (IV):

$$\omega_\pm = \frac{\omega_1 + \omega_2}{2} \pm \sqrt{\kappa^2 + \left(\frac{\omega_1 - \omega_2 + 2i\gamma}{2}\right)^2} \quad \text{(IV)}$$

Consider $\omega_{1,2} = \omega_0$, the above equation(IV) can be written as:

$$\omega_\pm = \omega_0 \pm \sqrt{\kappa^2 - \gamma^2} \quad \text{(V)}$$

When the equivalent resistance R is properly adjusted to adjust the loss, the system can be in a critical coupling state. That is, $\sqrt{\kappa^2 - \gamma^2} \approx 0$. The present disclosure uses the sensitivity near the critical coupling to achieve a detection improvement. Here, the inductance $L_{11}$ of the inductor in the second resonant loop is used as the weight-bearing deformation strain variable, which is introduced in the system as a perturbation $\Delta\omega$ of the intrinsic frequency $\omega_2$. Then the equation (IV) can be further rewritten as.

$$\omega_\pm = (\omega_0 + \Delta\omega) \pm \sqrt{\kappa^2 + \left(\frac{\omega_0 + \Delta\omega + 2i\gamma}{2}\right)^2} \quad \text{(VI)}$$

By further solving the above equation, it can be obtained that $\omega\pm \sim \sqrt{\Delta\omega}$, where the relationship is in the power of ½. This means that the accuracy will be further amplified for subtle changes.

In summary, the electromagnetic coupling sensing device 11 in the present disclosure is very suitable to improve the detection accuracy and sensitivity of the system.

The above embodiments are built according to a theoretical model. Here, the electromagnetic coupling hardware topology in the electromagnetic coupling sensing device module is shown in FIG. 1. The inductor 25 (L1), the coupling capacitor 5 (C0), the first capacitor 26 (C1), the second capacitor 34 (C2) are the lumped elements, and the coil 33 (L2) is a winding flexible coil assembly and a ferrite 36 of a certain height is provided in the middle of the coil 33 to improve the inductance variance of the coil 33 after deformation such that the sensitivity could be raised. In an embodiment, the height of the coil 33 must be a distance higher than the ferrite 36 (or called the core).

In some embodiments, the coil 33 is a copper wire with a diameter of 0.2 mm-1 mm. For example, a copper wire of 0.2 mm, 0.5 mm or 1 mm diameter could be optionally used. The number of spiral winding turns is determined according to the actual size, and the range is 5 turns-100 turns. Optionally, it could be 5 turns, 8 turns, 20 turns, 50 turns or 100 turns. The spiral diameter of winding is controlled at 5 mm-50 mm, such as 5 mm, 10 mm, 15 mm, 20 mm, 25 mm, 30 mm, 35 mm, 40 mm, 45 mm or 50 mm. In this way, the electromagnetic coupling sensing device 11 could have a better sensitivity and stability.

Since the ferrite 36 is built into the spiral structure of the coil 33, the diameter of the ferrite 36 is smaller than the diameter of the spiral. The diameter of the ferrite 36 is 4.5 mm-48 mm, such as 4.5 mm, 5 mm, 10 mm, 15 mm, 20 mm, 25 mm, 30 mm, 35 mm, 40 mm, 45 mm, or 48 mm. This preferred embodiment provides a relative balance between the space size and the magnetic field strength requirements.

In an embodiment, the thickness of the ferrite 36 is controlled at 33%-66% height of the coil 33 when the coil 33 is in the relaxation state, such as 33%, 40%, 50% or 66% height of the coil 33 when the coil 33 is in the relaxation state.

When there is no load, the height h of the coil 33 is 7.4 mm, and the inductance L2 of the coil 33 is 0.065 uH. After the deformation due to the load, the height h of coil 33 can change in the range of 6 mm~7.4 mm, and the inductance L2 of coil 33 can change in the range of 0.065uH~0.09uH. Finally, the deformation mass change range is 0-146 kg, and the normal working range is set to 0-50 kg.

The parameters of other components in the system are set as L1=L2=0.065 uH, C1=C2=6.8 nF, and C0=2.2 nF when there is no load. The operating frequency is set as 13.56 MHz, which is inputted by a fixed crystal oscillator. When the weight of the system changes, the height h of the variable flexible coil 33 changes, resulting in a change in the inductance L2 of the coil 33. Accordingly, the corresponding frequency $\omega_2$ of the system drifts, which results in the increase of the input reflection for fixing $\omega_0$=13.56 MHz. The voltage value outputted by the echo acquisition and processing module 4 increases. Finally, this signal can be fed back to the MCU to achieve the result of the weight test.

Figure 3:
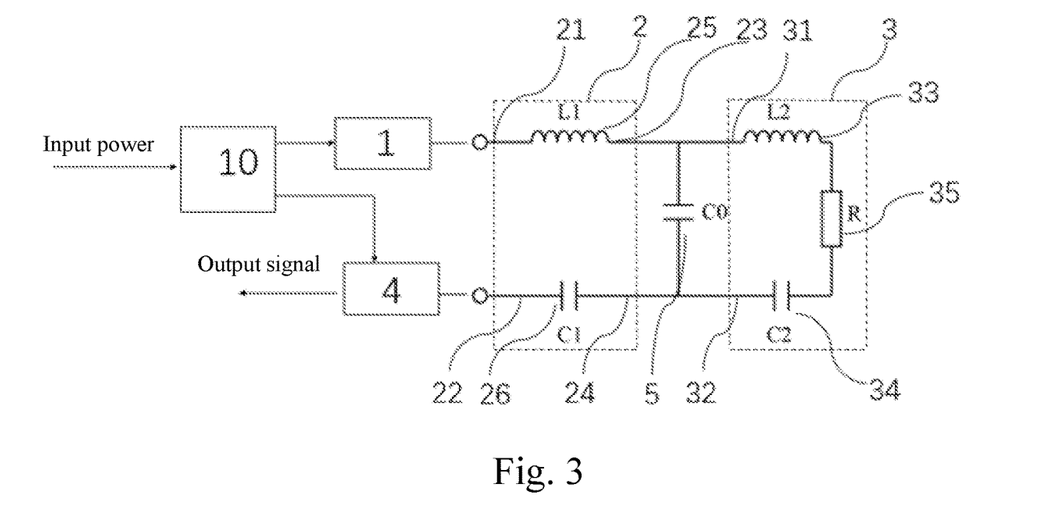
FIG. 3 is an equivalent schematic diagram of an electromagnetic coupling sensing device according to another exemplary embodiment of the present disclosure.

As illustrated in FIG. 3, the electromagnetic coupling sensing device may include a power module 10. When the system power is inputted, the power module 10 will convert a 5/9/12V DC voltage into to the 3.3/5V voltage to power the frequency generation module 1 (such as a crystal oscillator) and the echo acquisition and processing module 4.

By setting the power module 10 in the electromagnetic coupling sensing device, the range of the power voltage is expanded, and the power supply voltage regulation and filtering are realized, so that the whole device is more adaptable and reliable.

In the electromagnetic coupling sensing device 11 of the present disclosure, the conventional stress sensor could be used to get the final voltage value. Its principle is that a stress changes the resistance and the resistance change is fed back as a final voltage (e.g., designing a voltage divider circuit). The present disclosure utilizes a coil to assemble a LC tank to generate a resonant voltage under a fixed frequency and obtains the voltage value by mutual inductance. If the coil 33 in the sensing device is under a greater stress, the LC frequency offset is more severe and thus the resonant voltage is lower. At this time, an AC signal is obtained, which can become a DC signal after rectification and filtering. The DC signal is then amplified by the op amp to obtain a voltage signal output.

In another embodiment, on the basis of the above embodiments, the electromagnetic coupling sensing device 11 may also be integrated into, for example, a communication module, a display module, a voice module, etc., to achieve data communications with other devices, data display and voice input playback and other functions. The communication module includes but are not limited to 2G/3G/4G/5G modules, WiFi modules, Zigbee modules, LoRa, NBIOT, Bluetooth, etc.

As illustrated in FIG. 4, the upper end of the coil 33 may be provided with a strain gauge 38. The strain gauge 38 may be made of a non-magnetic response material (such as an engineering plastic, a carbon fiber or ceramic, etc.). The strain gauge 38 becomes a certain deformation structure after bearing force. When selecting the strain gauge 38, it should be noted that its Young's modulus should be within a reasonable range. Optionally, the strain gauge 38 and the coil 33 may be connected through a slot or glued together.

In some embodiments, in order to fix the lower end of the coil 33, optionally, the electromagnetic coupling sensing device further comprises a frame 39. A cylinder 37 is provided on the frame 39. The ferrite 36 is provided on the cylinder 37 and fixed on the frame 39. The strain gauge 38 may move up and down along the cylinder 37 with the deformation of the coil 33. The cylinder 37 can be an ordinary cylindrical structure with a small Young's modulus.

The ferrite 36 may be adhesively connected with the bottom of the frame 39. The cylinder 37 may be a metal or another material with an enough structural strength. The cylinder 37 and frame 39 could be integrally formed or joined with a high strength (such as welding or using a higher strength glue). Optionally, the frame 39 further comprises sidewalls. Optionally, the frame body 39 is a metal shell, mainly for shielding and structural strength.

According to an embodiment of the present disclosure, a signal measurement method is disclosed. The method is applied to the electromagnetic coupling sensing device of any of the above-mentioned embodiments. The method comprises: connecting to a power supply; placing an item to be measured on the coil 33 to deform the coil 33; and measuring a voltage signal output by the echo acquisition and processing module 4, wherein the voltage signal changes according to the intrinsic frequency of the electromagnetic coupling sensing device.

Figure 6:
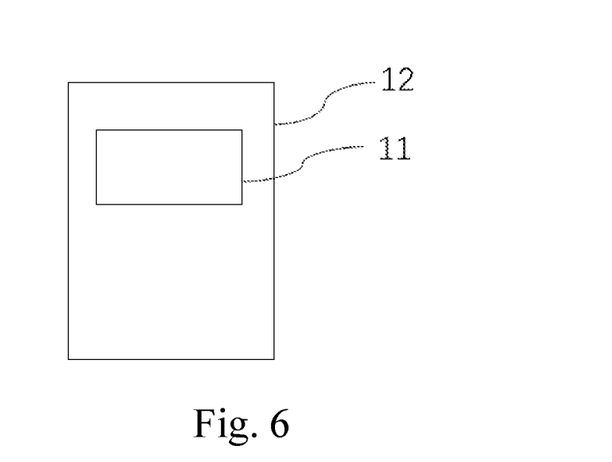
FIG. 6 is a schematic diagram of an electronic device according to an exemplary embodiment of the present disclosure.

As illustrated in FIG. 6, according to an embodiment of the present disclosure, an electronic device 12 is disclosed. The electronic device 12 may include the above-mentioned electromagnetic coupling sensing device 11.

For example, the above-mentioned electronic device can be, but are not limited to, an electronic scale, a weight sensor, an intelligent sweeping robot, a coffee machine, a food-delivery robot, etc., or any other portable devices or smart devices.

According to an embodiment of the present disclosure, the electromagnetic coupling sensing device 11 in the electronic device could improve the accuracy of weight measurement.

For hardware implementations, the microprocessor 6 can be implemented in one or more Application Specific Integrated Circuits (ASICs), Digital Signal Processing (DSPs), digital signal processing devices (DSPDs), programmable logic devices (PLDs), field-programmable gate arrays (FPGAs), general-purpose processors, controllers, microcontrollers, microprocessors, other electronic units for performing the functions of the present disclosure, or a combination thereof.

For software implementation, the technology of the present disclosure may be implemented with units that perform the functions of components of any of the above-mentioned embodiments. Software codes can be stored in a memory and executed by a microprocessor 6. The memory may be implemented in the microprocessor 6 or outside the microprocessor 6.

One having ordinary skills in the art may be aware that the units and algorithm steps described in any of the above embodiments may be implemented with electronic hardware, or a combination of computer software and electronic hardware. Whether these functions are performed in hardware or software depends on the specific application and design demands. One having ordinary skills in the art may implement these functions in different ways and these modifications all fall within the scope of the present disclosure.

Those skilled in the art can clearly understand that for the convenience and brevity of the description, the specific operating process of the above-mentioned system, device and unit can refer to the corresponding process in the foregoing method embodiment, which will not be repeated here.

It should be understood that the foregoing description is for purposes of illustration and not limitation. Many embodiments and many applications other than the examples provided will be apparent to those of skill in the art from reading the foregoing description. The scope of the present teachings, therefore, should be determined not with reference to the above description, but should be determined with reference to the preceding claims, along with the full scope of equivalents to which such claims are entitled. The disclosures of all articles and references, including patent applications and publications, are hereby incorporated by reference for completeness. The omission from the preceding claims of any aspect of the subject matter disclosed herein is not intended to be a disclaimer of such subject matter, nor should it be considered that the applicant did not consider the subject matter to be part of the disclosed subject matter of the application.

What is claimed is:

1. An electromagnetic coupling sensing device, comprising:
    a frequency generation module, configured to generate a frequency setting signal;
    a first resonant module, configured to generate a primary resonant signal based on the frequency setting signal;
    a second resonant module, configured to couple with the first resonant module through a coupling capacitance to generate a secondary resonant signal based on the primary resonance signal; wherein the second resonant module comprises a coil disposed in a Z direction, a ferrite is provided in the coil and a height of the coil is higher than the ferrite; the coil is configured to carry a weight to be measured to deform such that an intrinsic frequency of the electromagnetic coupling sensing device changes; and
    an echo acquisition and processing module, electrically connected to the second resonant module, configured to collect the secondary resonant signal and output a voltage signal changing according to the intrinsic frequency of the electromagnetic coupling sensing device.

2. The electromagnetic coupling sensing device of claim 1, wherein the echo acquisition and processing module comprises a sampling unit, an operation amplification unit and a voltage comparison unit; and wherein a current of the secondary resonant signal sequentially passes through the sampling unit, the operation amplification unit and the voltage comparison unit to output the voltage signal.

3. The electromagnetic coupling sensing device of claim 2, further comprising:
    a microprocessor, electrically connected to the output of the voltage comparison unit, configured to receive the voltage signal to output quality data.

4. The electromagnetic coupling sensing device of claim 1, wherein the frequency generation module comprises a crystal oscillator, and the electromagnetic coupling sensing device further comprises a microprocessor, a driving circuit and a switch circuit;
wherein the switch circuit comprises a first switch and a second switch, sources of the first switch and the second switch are electrically connected to a common end; a drain of the first switch is electrically connected to the first resonant module and a DC power supply; a drain of the second switch is electrically connected to the second resonant module; and
wherein the microprocessor is connected to the driving circuit which is connected to the drain of the first switch and the drain of the second switch, and is coupled to gates of the first switch and the second switch, so as to change the DC power supply into a square wave of the same frequency as the crystal oscillator to input the square wave into the first resonant module and the second resonant module.

5. The electromagnetic coupling sensing device of claim 1, wherein the coil is a copper coil, and a diameter range of the coil is 0.2 mm-1 mm.

6. The electromagnetic coupling sensing device of claim 1, wherein a number of turns of the coil ranges from 5 turns-100 turns.

7. The electromagnetic coupling sensing device of claim 1, wherein a thickness range of the ferrite is 33%-66% of the height of the coil in its relaxed state.

8. The electromagnetic coupling sensing device of claim 1, wherein the ferrite is a cylinder with a diameter range of 4.5 mm-48 mm.

9. The electromagnetic coupling sensing device of claim 1, wherein the first resonant module comprises a first frequency input end, a first frequency output end, a first coupling end and a second coupling end; an inductor is connected between the first frequency input end and the first coupling end; a first capacitor is connected between the first frequency output end and the second coupling end; and the first coupling end and the second coupling end are coupled to the second resonant module.

10. The electromagnetic coupling sensing device of claim 9, wherein the second resonant module comprises a third coupling end and a fourth coupling end; the third coupling end and the first coupling end are connected, the fourth coupling end and the second coupling end are connected, and the coil and the second capacitor are connected in series between the third coupling end and the fourth coupling end; and the first coupling end and the second coupling end are connected through a coupling capacitor.

11. The electromagnetic coupling sensing device of claim 1, further comprising:
a strain gauge, connecting to an upper end of the coil.

12. The electromagnetic coupling sensing device of claim 11, further comprising:
a frame, having a cylinder that is inserted into the ferrite.

13. The electromagnetic coupling sensing device of claim 1, further comprising:
a power supply module, electrically connected to the frequency generation module or the echo acquisition and processing module, configured to buck an input voltage to supply power to the frequency generation module and/or the echo acquisition and processing module.

14. A method of measuring signal applied to an electromagnetic coupling sensing device, the electromagnetic coupling sensing device comprising:
a frequency generation module, configured to generate a frequency setting signal;
a first resonant module, configured to generate a primary resonant signal based on the frequency setting signal;
a second resonant module, configured to couple with the first resonant module through a coupling capacitance to generate a secondary resonant signal based on the primary resonance signal; wherein the second resonant module comprises a coil disposed in a Z direction, a ferrite is provided in the coil and a height of the coil is higher than the ferrite; the coil is capable of carrying a weight to be measured to deform such that an intrinsic frequency of the electromagnetic coupling sensing device changes; and
an echo acquisition and processing module, electrically connected to the second resonant module, configured to collect the secondary resonant signal;
wherein the method comprises:
connecting to a power supply;
placing an object to be measured on the coil to deform the coil; and
measuring a voltage signal output by the echo acquisition and processing module, wherein the voltage signal changes according to the intrinsic frequency of the electromagnetic coupling sensing device.

15. An electronic device, comprising:
an electromagnetic coupling sensing device, wherein the electromagnetic coupling sensing device comprises:
a frequency generation module, configured to generate a frequency setting signal;
a first resonant module, configured to generate a primary resonant signal based on the frequency setting signal;
a second resonant module, configured to couple with the first resonant module through a coupling capacitance to generate a secondary resonant signal based on the primary resonance signal; wherein the second resonant module comprises a coil disposed in a Z direction, a ferrite is provided in the coil and a height of the coil is higher than the ferrite; the coil is capable of carrying a weight to be measured to deform such that an intrinsic frequency of the electromagnetic coupling sensing device changes; and
an echo acquisition and processing module, electrically connected to the second resonant module, configured to collect the secondary resonant signal and output a voltage signal changing according to the intrinsic frequency of the electromagnetic coupling sensing device.

16. The electronic device of claim 15, wherein the echo acquisition and processing module comprises a sampling unit, an operation amplification unit and a voltage comparison unit; and wherein a current of the secondary resonant signal sequentially passes through the sampling unit, the operation amplification unit and the voltage comparison unit to output the voltage signal.

17. The electronic device of claim 15, wherein the electromagnetic coupling sensing device further comprises:
a microprocessor, electrically connected to the output of the voltage comparison unit, configured to receive the voltage signal to output quality data.

18. The electronic device of claim 15, wherein the frequency generation module comprises a crystal oscillator, and the electromagnetic coupling sensing device further comprises a microprocessor, a driving circuit and a switch circuit;
wherein the switch circuit comprises a first switch and a second switch, sources of the first switch and the second switch are electrically connected to a common end; a drain of the first switch is electrically connected to the first resonant module and a DC power supply; a drain of the second switch is electrically connected to the second resonant module; and wherein the microprocessor is connected to the driving circuit which is connected to the drain of the first switch and the drain of the second switch, and is coupled to gates of the first switch and the second switch, so as to change the DC power supply into a square wave of the same frequency as the crystal oscillator to input the square wave into the first resonant module and the second resonant module.

19. The electronic device of claim 15, wherein the coil is a copper coil, and a diameter range of the coil is 0.2 mm-1 mm.

20. The electronic device of claim 15, wherein a number of turns of the coil ranges from 5 turns-100 turns.

* * * * *